United States Patent [19]

Ruskin et al.

[11] Patent Number: 4,702,787
[45] Date of Patent: Oct. 27, 1987

[54] PROCESS FOR MAKING DRIP IRRIGATION LINES

[75] Inventors: Rodney Ruskin, San Francisco; Rael Sacks, Fresno, both of Calif.

[73] Assignee: Agrifim Irrigation International NV, Curacao, Netherlands Antilles

[21] Appl. No.: 503,275

[22] Filed: Jun. 10, 1983

[51] Int. Cl.$^4$ ............................................. B29C 45/16
[52] U.S. Cl. .............................. 156/244.25; 156/245; 156/301; 264/259; 264/328.1
[58] Field of Search ...................... 156/244.11, 244.12, 156/242, 243, 244.25, 244.22, 244.27, 297, 245, 300, 301; 239/109, 542, 547; 138/42, 45, 46; 264/259, 299, 316, 328.1, 328.16, 328.8; 425/547, 548

[56] References Cited

U.S. PATENT DOCUMENTS

| | | | |
|---|---|---|---|
| 3,896,999 | 7/1975 | Barragán | 239/542 X |
| 4,173,309 | 11/1979 | Drori | 239/547 X |
| 4,177,946 | 12/1979 | Sahagun-Barragan | 239/542 X |
| 4,210,287 | 7/1980 | Mehoudar | 239/542 |
| 4,216,184 | 8/1980 | Thomas | 264/259 X |
| 4,413,787 | 11/1983 | Gilead et al. | 239/542 |
| 4,473,525 | 9/1984 | Drori | 156/244.18 X |
| 4,534,515 | 8/1985 | Chapin | 239/542 |
| 4,572,756 | 2/1986 | Chapin | 156/203 |

FOREIGN PATENT DOCUMENTS

| | | | |
|---|---|---|---|
| 2365375 | 4/1978 | France | 239/542 |
| 2386252 | 12/1978 | France | 239/542 |

Primary Examiner—Donald E. Czaja
Assistant Examiner—Ramon R. Hoch
Attorney, Agent, or Firm—Christie, Parker & Hale

[57] ABSTRACT

A method for making drip irrigation lines comprises feeding an elongated sheet of flexible polyethylene film to an injection molding machine for injection molding a series of drippers across a face of the film. A moldable thermoplastic material is injected into multiple die cavities, forming separate drippers each simultaneously heat-bonded to the film. Each dripper has a molded labyrinthine flow-restricting passage extending along it. The mold is opened, the film is advanced, and further series of drippers are injection molded across the face of the film. The previously molded set of drippers are closed off by heat sealing a separate strip of flexible film to a face of each molded dripper to form sealed internal pressure-reducing labyrinthine passages in the drippers. An inlet opens into one end of the sealed internal passage and an outlet opens from the opposite end through the film. The outlet is formed and reinforced during the molding process. A second layer of film is overlayed on the sealed drippers and on the film onto which the drippers are heat-bonded. The second film is bonded to the other film along parallel seams between the drippers, and the film is then cut along the seams to form multiple continuous drip irrigation supply tubes with the molded drippers being spaced apart along the inside of each supply tube.

32 Claims, 14 Drawing Figures

PROCESS FOR MAKING DRIP IRRIGATION LINES

BACKGROUND OF THE INVENTION

1. Field of the Invention

This invention relates to drip irrigation; and more particularly, to a method for making drip irrigation lines in which the drippers are molded and simultaneously bonded to a flexible sheet used to make the supply pipe.

2. Description of the Prior Art

Drip irrigation systems usually include a continuous irrigation water supply line with emitter-type drippers installed along the line, usually at regular intervals. Irrigation water flows through the supply line under pressure, and a small amount of water continuously drips out at the intervals where the drippers are located. Drip irrigation has proved to be highly successful in producing greater growth of vegetation for the same amount of water, when compared with conventional irrigation techniques.

A number of different drip irrigation systems have been used in the past. They vary from the cheapest and simplest of systems, namely, a hole in the wall of the water supply line, to expensive and complex multi-component dripper units.

There is a need for a low cost dripper system having reliable performance in terms of uniform flow rates and resistance to clogging at operating pressures of say between 7 to 40 psi. A single hole in the water supply line may be the cheapest of drip systems, but such an approach is not satisfactory in most cases. The hole in the pipe wall must be of minute size to produce the desired dripping rate. However, the required hole size is so small that blockage is almost inevitable at a number of places along the line, even with filtering. Moreover, a minute hole limits the practical operating pressure in the supply line to less than about 10 psi. At higher, more desirable line pressures of above say 15 psi, the water jets or sprays through the holes in the pipe wall. By reliably running a drip irrigation system at a higher oeprating pressure of say 15 psi, longer supply lines can be used; more output, in terms of gallons of water per hour, is produced; and the system can work on undulating ground (up and down slopes) as well as on reasonably flat ground.

A large number of more sophisticated drip irrigation systems have been developed for the purpose of overcoming the problems inherent in a single hole in the wall-type of irrigation line. A common and successful approach involves use of separate drip emitters or drippers installed in or on the supply pipe. The dripper taps off a portion of the water flowing in the supply line and passes the water through a labyrinth or other meandering or circuitous path that produces a large pressure drop in the water and discharges it at a uniform drip rate. Generally, such pressure-reducing labyrinthine drippers are successful because they use a large enough hole in the supply pipe and a wide enough passage through the labyrinth to avoid clogging in most cases, while they can be used at higher line pressures.

There is a need to reduce the capital, material, and labor costs of manufacturing high-quality emitter-type dripper lines. Emitters usually consist of two to four molded sections assembled together and then mounted or inserted into the supply pipe. The cost of assembly and mounting of the dripper is a substantial proportion of the total cost of the dripper line. Emitter-type systems also can involve expensive molding and bonding techniques and materials.

In addition to the need for reasonably low capital, material, and labor costs, it is also desirable that emitter-type systems be capable of use with thin wall supply pipe as well as more permanent heavy wall pipe. Orchards and vineyards, for example, commonly use permanent drip irrigation systems, whereas cheaper thin wall pipe can be used for temporary drip irrigation sites.

There is also a need to ensure that the emitter-type dripper system will operate reliably during use, avoid clogging in most cases, and be capable of use at higher line pressures.

The present invention provides a method for making an emitter-type drip irrigation line with inexpensive injection molding techniques and materials which reduce the capital, material, and labor costs of making the dripper line. The resulting dripper line preserves the advantages of the high quality emitter-type systems and is reliable in use. In addition, the method can be used for making low-cost, thin-wall dripper lines as well as more permanent dripper systems made from heavy wall film.

SUMMARY OF THE INVENTION

Briefly, one embodiment of this invention comprises a method for making an emitter-type drip irrigation line comprising forming a moldable material as a layer having a flow-restricting passage extending along it and simultaneously adherently attaching the layer to a flexible sheet. A side of the layer opposite from the flexible sheet is scaled in order to form a closed internal pressure-reducing chamber having an inlet and an outlet. A drip irrigation supply tube is then formed from the flexible sheet so that the inlet to the closed chamber communicates with the interior of the supply tube, and the outlet from the chamber is exterior to the supply tube.

In another embodiment, the moldable material is molded to form separate flow-restricting drippers which are heat-bonded to the sheet by the heat of the molding process. The drippers are bonded at intervals along the length of the sheet. The molded drippers are then sealed to form a closed internal pressure-reducing chamber in each dripper. The flexible sheet on which the drippers have been molded and sealed is then formed into a continuous drip irrigation supply tube, with the drippers being inside the supply tube.

Thus, the labyrinthine drippers are simultaneously molded and heat-bonded to the sheet, after which the supply tube is made, at least in part, from the same sheet. The dripper system can provide the advantages of high quality emitter-type dripper lines in a reliable design. With the sealed drippers on the inside of the supply tube, water pressure in the supply tube presses against the sealed inside of the dripper and tends to close the dripper seal, rather than working against it. This seal also can provide pressure compensation by reducing the flow path in response to internal line pressures, as described in more detail below.

These and other aspects and advantages of the invention will be more fully understood by referring to the following detailed description and the accompanying drawings.

DETAILED DESCRIPTION

Figure 7:
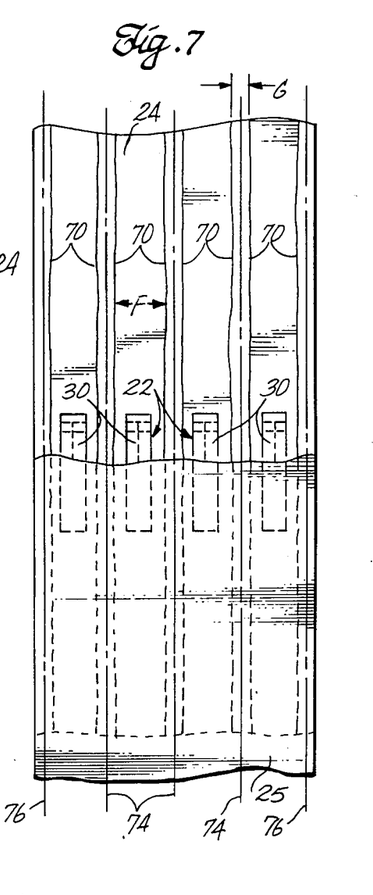
FIG. 7 is a fragmentary top plan view illustrating a method for forming multiple drip irrigation supply tubes.
Figures 8, 9, 14:
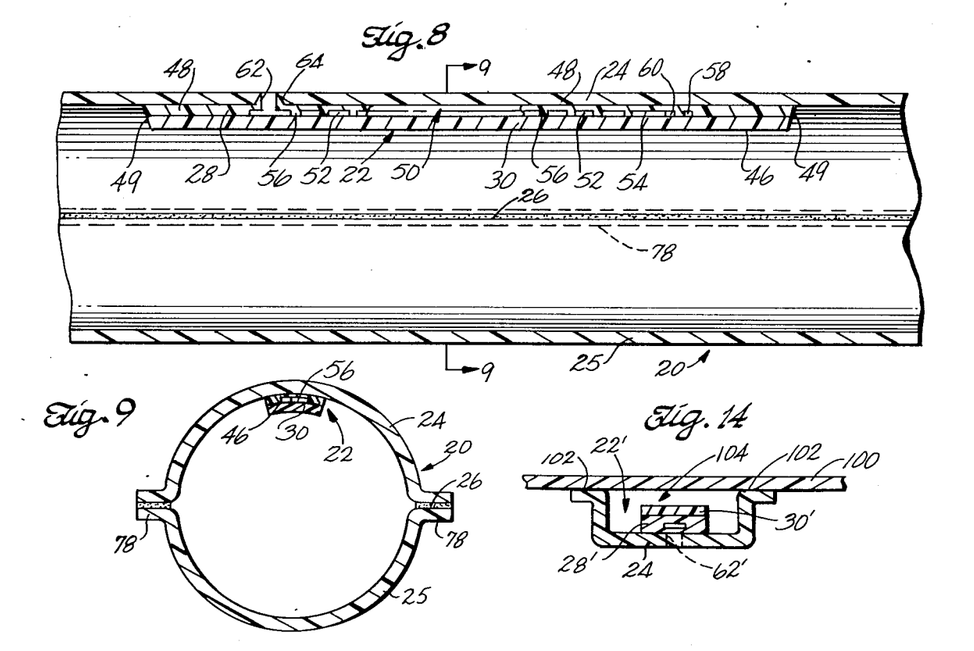
FIG. 8 is a cross-sectional view of a completed dripper unit made by the process illustrated in FIGS. 1 through 7.
FIG. 9 is a cross-sectional view taken on line 9—9 of FIG. 8.
FIG. 14 is a cross-sectional view illustrating an alternative use of the dripper of this invention.
Figure 10:
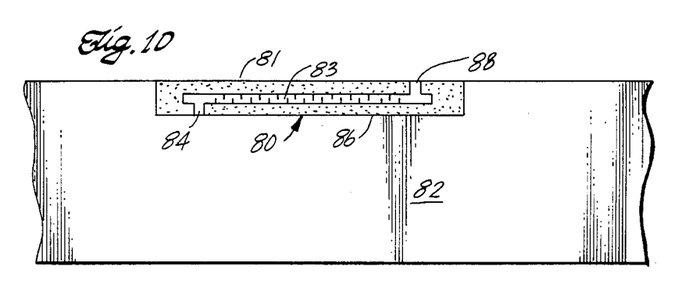
FIG. 10 is a fragmentary top plan view illustrating a molded dripper formed according to an alternative method of this invention.

FIGS. 1 through 7 schematically illustrate one embodiment of a method for making drip irrigation supply lines with injection molded drippers in a continuous process according to principles of this invention. In the illustrated embodiment, four side-by-side emitter-type drippers are simultaneously injection molded and heat-bonded onto a sheet of film which is later used to make four side-by-side drip irrigation supply pipes which are then cut into separate drip irrigation lines. The method of making four dripper lines in the same process is by way of example only, since the number of dripper lines being made can vary. The drippers are injection molded onto the film, and the film is then advanced a selected distance, after which the next set of drippers are injection molded onto the same face of the same film. The injection molded drippers are separately sealed, and thereafter the film on which the drippers are molded is formed into the tubular supply lines. The result is four separate lengths of supply pipe with molded drippers spaced apart at intervals along the length of each supply pipe. The resulting dripper line is illustrated in FIGS. 8 and 9 and includes a tubular supply pipe 20 having an injection molded dripper 22 simultaneously sealed by the heat of injection to the inside of the pipe. The supply pipe includes a length of flexible film 24 onto which each dripper is injection molded, and a second length of flexible film 25 bonded to the other film 24 by adhesive 26 to complete the tubular supply pipe. Each dripper unit 22 includes a flow-restricting labyrinthine channel portion 28 injection molded onto the face of the film, and a channel seal 30 sealed to the inside face of the molded labyrinthine channel portion 28. The channel seal seals the interior of the finished dripper unit from the interior of the supply pipe, forming an internal pressure-reducing channel.

Figure 1:
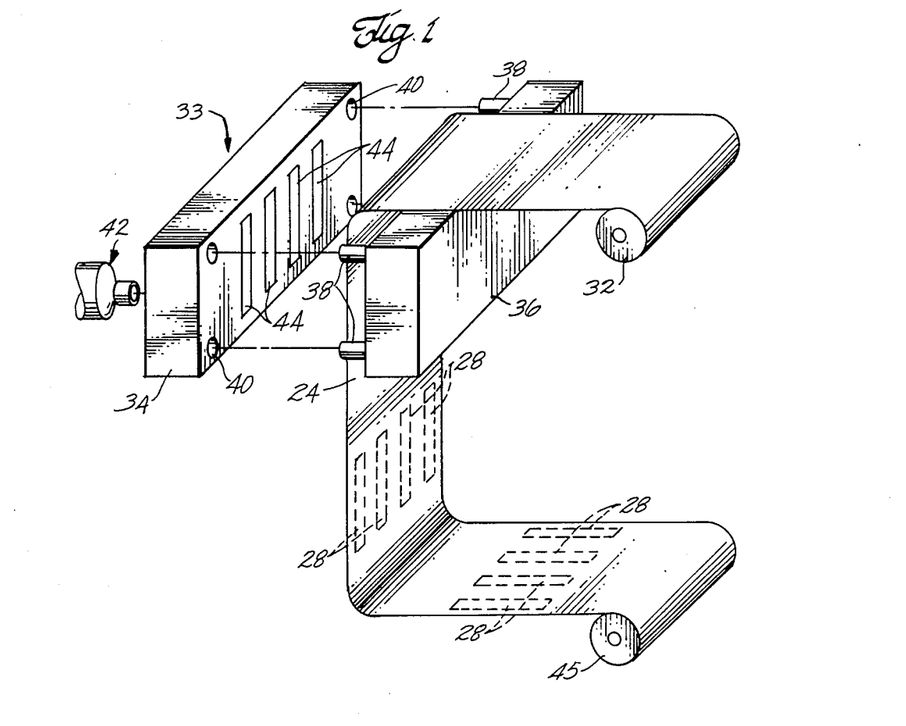
FIG. 1 is a schematic perspective view illustrating a technique for injection molding drippers onto a continuous sheet of film according to principles of this invention.

FIG. 1 schematically illustrates a continuous method for making the drip irrigation emitters and supply pipe. The flexible film 24 passes from a supply roll 32 to an injection mold 33. The film 24 is preferably a thermoplastic film such as polyethelyne, which is capable of being formed into a tubular supply pipe sufficient to hold the required water pressure during use. In one embodiment, the polyethelyne film 24 has a film thickness of about 0.004 to 0.005 inch and is approximately 5½ inches wide. The thickness of this film 24 can vary. For instance, it can be up to about 0.020 inch thick, or more. Rubbery materials can be used in supply pipe materials of greater film thickness. The materials from which the film can be made also can vary, and these materials are described below. The film 24 passes around guide rollers (not shown) for directing a vertical length of the film between the hot half 34 and the cold half 36 of the injection mold. The film drive mechanism is indexed to advance a preset length of film to the mold and stop the film where the four side-by-side dripper units 22 are molded across the face of the film. When the film is stopped, one mold half is closed by clamping the mold halves together to trap the film between the opposite halves. Pins 38 on the cold half 36 register with holes 40 on the hot half 34 for holding the mold plates together as the drippers are injection molded onto the face of the film. An injection cylinder and nozzle 42 force the molten thermoplastic material into die cavities 44 on the hot hall 34. Each die cavity has a steel die in the shape of the labyrinthine channel portion 28 of the dripper being formed. The hot plastic is forced under pressure into the die cavities 44 against the face of the film. The molten plastic assumes the shape of the die cavity and is held under pressure until it cools sufficiently to solidify. Each dripper portion 28 is thus molded in layer form and simultaneously heat bonded onto the face of the film by the heat of the molding process. A system called a hot runner mold is preferably used to make the dripper portions 28. A hot runner is injected into a tab (not shown) on the side of each dripper, which avoids interference with the top of the mold cavity. The thermoplastic material from which the dripper portions 28 are molded is preferably a material which is compatible with the film material so that the heat bonding can take place without the need for bonding agents or adhesives. In one embodiment, the dripper portions are made of polyethylene.

After the molded dripper portions 28 have cooled and solidified, the mold halves are opened and the film 24 is advanced. The molding process is then repeated at a preset distance further along on the film. The finished film and molded, heat bonded dripper portions 28 accumulate on a take-up roll 45.

FIGS. 2 through 5 illustrate details of the injection molded labyrinthine dripper portions 28. The molded labyrinthine channel portion 28 of each dripper is deposited onto the film as a thin layer comprising a thin, flat rectangular base having a flat upper surface 46, a flat bottom surface 48 parallel to the upper surface 46 and bonded to the film 24, and an upwardly and inwardly inclined outer wall 49 extending around the rectangular outer periphery of the base. A recessed channel 50 extends along the centerline of the base, parallel to the long dimension of the rectangular base. The channel has principal side walls 52 on opposite sides of a flat bottom surface 54 of the channel. The interior of the channel also has a plurality of longitudinally spaced-apart, elongated ribs or baffles 56 that extend into the channel 50 from both of the principal side walls 52 that form the channel outer boundary. The ribs 56 are interleaved along the length of the channel and are generally parallel to one another and generally perpendicular to the long side boundaries of the channel. The ribs thus form a continuous meandering or labyrinthine channel that constantly reverses its direction from one end of the channel to the other. The tops of the ribs 56 are continuous with the elevation of the upper surface 46 that spans the perimeter of the molded rectangular base. A pair of parallel inlet channels 58 and 60 have inner ends that open into one end of the labyrinthine channel 50. The outer ends of each inlet channel open through opposite side walls of the base. The inlet channels are recessed in the upper surface 46 of the dripper. An outlet passage 62 at the end of the channel 50 opposite the inlet channel 58 and 60 extends from the interior of the labyrinthine channel through the base 54 of the channel and through a reinforcing nipple 64 which extends through the wall of the film 24, During the molding process, a pin (not shown) forms a hole in the wall of the film, and the outlet passage 62 and reinforcing nipple 64 are formed in registration with the hole in the film to form the outlet for the labyrinthine channel. Thus, the reinforced exit hole is made simultaneously with the molding of the dripper and its heat bonding to the face of the film. This provides a low-cost and reliable method for aligning the exit hole with the flow path in the pressure-reducing channel, when compared with a dripper that is later aligned with an existing exist hole, or an exit hole that is formed after an existing dripper is installed. The reinforced exit hole also avoids irregularities caused in the drip rate by unreinforced material that deteriorates or is worn around the exit hole during use.

Figure 4:
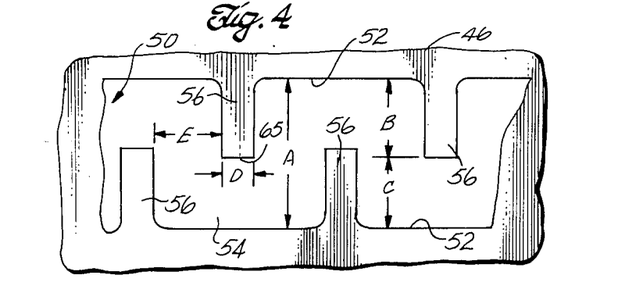
FIG. 4 is a fragmentary plan view showing a section of the labyrinthine dripper passage within the circle 4 of FIG. 3.
Figure 5:
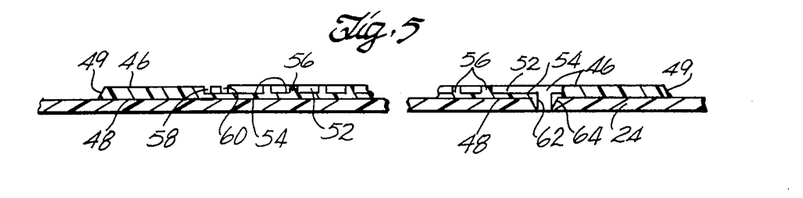
FIG. 5 is a fragmentary cross-sectional view taken on line 5—5 of FIG. 3.
Figure 6:
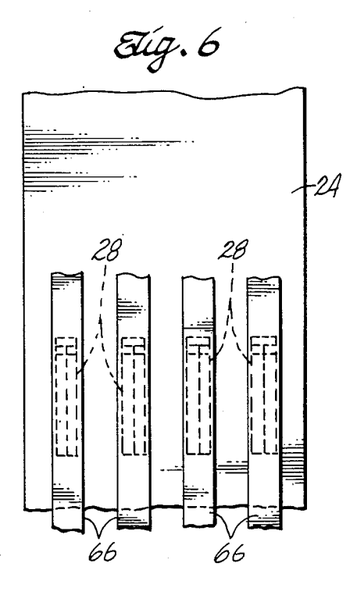
FIG. 6 is a fragmentary top plan view showing means for sealing the drippers to form internal dripper chambers.

FIG. 4 shows the detailed construction and dimensions of one embodiment of the labyrinthine channel. The maximum width A of the channel is about 0.068 inch. The distance from the tip of each baffle to the opposite side wall of the channel, dimension C, is approximately 0.032 inch. The length of each baffle, dimension B, is approximately 0.036 inch. Since the baffles are interleaved along the length of the channel, this produces an overlap at the tips of the baffles of approximately 0.004 inch, or more than about 10 percent of the length of each baffle. The opposite side walls of each baffle are parallel to one another, terminating in a flat end wall 65 with a width D of approximately 0.015 inch. The small radii at the bottom opposite corners of each baffle are the minimum practical radii required for use of the die that forms the molded baffles. The longitudinal distance E between adjacent edges of adjacent baffles is approximately 0.032 inch. The maximum thickness of the molded base is approximately 0.042 inch. The depth of the channel 50 is approximately 0.032 inch, and the thickness of the channel base (from the bottom 54 of the channel to the bottom surface 48 of the molded base) is approximately 0.010 inch. The length of each molded dripper base is approximately 3.51 inches and the maximum width of each dripper base is approximately 0.4 inch.

Figure 2:
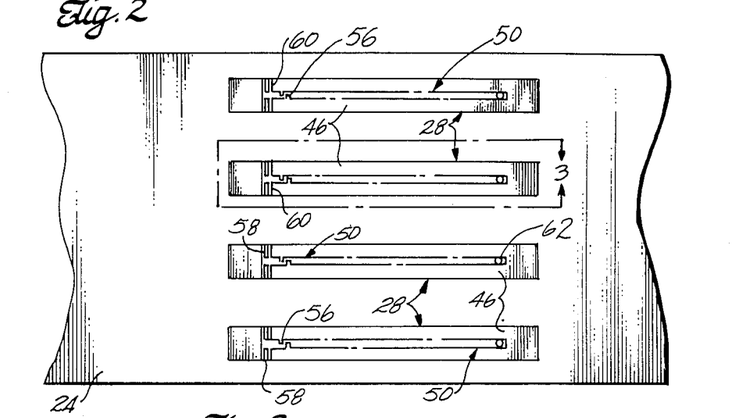
FIG. 2 is a fragmetary top plan view illustrating a series of injection molded drippers formed on the film.
Figure 3:
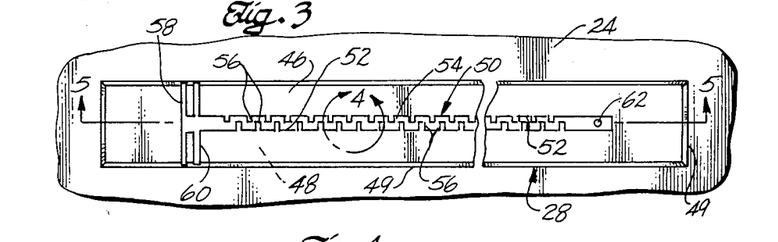
FIG. 3 is an enlarged fragmentary plan view illustrating one of the drippers shown within the boundary 3 in FIG. 2.

As illustrated best in FIG. 2, the molded dripper portions 28 are identical and are formed at equidistantly spaced-apart locations across the width of the film 24. The long dimensions of the dripper portions extend parallel to the length of the film. In one embodiment, the molded dripper portions are spaced approximately 1.25 inches apart on-center. The centerline of each outermost dripper is spaced inwardly from the edge of the film by approximately 0.625 inch.

The upper portions of the molded labyrinthine channel portions 28 are next closed off to form a sealed interior labyrinthine channel within each dripper unit. As shown best in FIG. 6, the dripper channels are sealed by first overlaying separate elongated seal strips 66 on the upper surface 46 of each previously molded channel portion 28. Each seal strip is a separate elongated continuous length of thin, flexible plastic film approximately the same width as the dripper units 28. The width of the film strip 66 is shown exaggerated in FIG. 6 for clarity. Each seal strip is preferably made of the same thermoplastic film, such as polyethelyne, from which the dripper portions 28 are molded. Each seal strip is thus approximately 0.4 inch wide and 0.004 to 0.005 inch thick. The seal strips are then heat welded to the molded dripper units by conventional heat seal techniques. For instance, the seal strips can be heat sealed to the drippers by separate heating elements (not shown) which fuse each seal strip to the upper surface 46 of a corresponding molded dripper unit. The heat seal is continuous around the perimeter of the labyrinthine channel, with the exception of the inlet channels 58 and 60 which open into the labyrinth. The seal strip is not heat sealed to the tops of the baffles 56, but the bottom of the seal strip rests against the tops of the baffles, as illustrated in FIG. 9. Thus, a sealed internal labyrinthine channel is formed inside each completed dripper 22. Following the heat sealing step, the opposite ends of the seal strip are cut to match the length of the previously molded dripper units to thereby form the channel seal 30 (see FIGS. 8 and 9) for each dripper unit.

The drippers are thus molded and simultaneously heat bonded to the film and then sealed in a continuous process for forming multiple rows of sealed dripper units along the length of the film. Next, the film 24 on which the rows of dripper units 22 are formed is used to form multiple elongated supply pipes 20 in which the dripper units 22 are sealed inside the finished supply pipes. As shown best in FIG. 7, a series of eight beads 70 of molten adhesive are applied in continuous parallel lines along a length of film 24, so that two parallel beads of adhesive extend along opposite sides of each row of drippers. The glue beads are applied in a hot melt extrusion bead sealing process. Each set of parallel beads on opposite sides of each row of drippers is spaced apart by the same distance. In the embodiment in which the drippers are spaced apart laterally by a distance of approximately 1.25 inch, the beads of adhesive on opposite sides of each row of drippers are spaced apart by a distance of approximately 1.125 inch (the dimension F in FIG. 7). The adjacent beads of adhesive between adjacent drippers (the dimension G in FIG. 7) are spaced apart by a distance of approximately one-eight inch. The preferred adhesive is a thermoplastic adhesive resin such as an ethylene methyl acrylate adhesive which is extruded while hot through separate nozzles (not shown).

A continuous flexible thermoplastic film sheet such as a sheet 25 of polyethylene approximately 0.004 to 0.005 inch thick is then overlayed on the same face of the film sheet 24 on which the glue beads 70 are formed. This bonds the overlayed sheet 25 to the sheet 24 along the continuous glue beads, forming separate side-by-side closed tubular supply pipes with the sealed dripper units 22 spaced at intervals along the inside of each supply pipe. After the overlayed film sheets 24 and 25 have been adhesively bonded along opposite sides of each row of drippers, the overlayed film sheets are cut along lines 74 between adjacent glue beads and along lines 76 adjacent the outer glue beads to form four separate supply pipes 20 with the rows of sealed drippers 22 inside them. The finished supply pipe 20 thus has seams 78 along opposite sides formed as a continuous fin seal. The steps of applying the glue beads, overlaying the film overlay 25, bonding, and cutting into individual supply pipes can be done continuously at high speed. Any thermoplastic type adhesive can be used for bonding the two sheets. With the ethylene methyl acrylate adhesive, it is possible to obtain a seam strength that is greater than the wall strength of the film from which the supply tube is made.

Use of the second overlayed film sheet 25 to form the completed supply pipe 20 is a preferred technique. Other alternative techniques for forming a supply pipe from the film on which the drippers have been molded also can be used. For instance, in one alternative method the film 24 on which the drippers are molded can be used to form the entire supply tube and a single lap seal can be used for sealing opposite sides of the film along the length of the completed tube. Further, the sealed portions of the supply tube wall can be heat-bonded as an alternative to adhesive bonding.

The present invention makes it possible to conveniently form the supply tubes from a number of different materials, such as heat or adhesively sealable films, including laminates or co-extrusions of combinations of such materials as polyethylene (high-density, low-density, or linear low density), ethyl vinyl acetate (or co-polymers of EVA), polypropylene, polybutylene, nylon, coated paper or aluminum, or various nonwoven fabrics. The type of material used can be readily changed from one production run to the next. In addition, the width of the film (for controlling the diameter of the supply tube) also can be readily adjusted to meet the customer's requirements.

In using the drip irrigation tubing, water under pressure of say 7 to 40 psi flows in the irrigation supply tube. A small amount of water in the supply tube passes through the inlet channels 58 and 60 and into the sealed labyrinthine channel in the dripper unit, creating an appreciable pressure drop along the path of the water as it flows from the inlet region of the labyrinth through the labyrinth toward the discharge end where the water is discharged through the outlet passage 62 at a slow drip rate. The labyrinth produces a substantial pressure drop in the water passing through it for providing the desired drip rate at the discharge end. The particular labyrinth described above is a turbulent flow labyrinth, in which the water spins as it passes into each section of the labyrinth, creating a pressure drop through internal frictional losses. The drippers 22 also can have other labrinthine or meandering flow paths; a spiral flow, or other laminar flow paths; a vortex flow channel, other types of turbulent flow channels; or other means for producing the desired pressure reduction. For simplicity, the closed internal flow passage through the dripper is referred to generally as a pressure-reducing channel.

The drip irrigation supply tube and emitters produced by this method have the advantage that the inside wall of the dripper unit formed by the channel seal 30 is inside the finished supply pipe. Therefore, internal hydraulic pressure in the main supply pipe during use (say 15 psi) pushes the channel seal 30 toward the labyrinthine channel and against the top portions of the baffles 56. This internal pressure seals the labyrinth against possible short-circuiting of water flow through the pressure-reducing channel and ensures a constant uniform drip rate at the discharge end of the dripper.

The channel seal 30 can act as a natural pressure compensator during use. The channel seal 30 can be made from a flexible material so that internal fluid pressure in the supply line during use can push the flexible seal farther into the labyrinth in direct proportion to the magnitude of the operating pressure in the main supply tube. This flexing of the channel seal restricts the flow through the labyrinth in proportion to increases in fluid pressure in the supply line, thereby providing inherent pressure compensation. The method for molding the drippers, as provided by this invention, also facilitates use of other types of pressure compensators, such as various flexible diaphragm pressure compensators, which can be made, at least in part, at the time the drippers are molded. These pressure compensators can be arranged inside the main supply tube to operate in response to changes in fluid pressure in the supply tube.

FIGS. 10 through 13 illustrate alternative forms of the method of this invention. A molded thermoplastic labyrinthine channel portion 80 of a dripper is injection molded and heat bonded onto a face of a flexible sheet 82 of plastic film used later to form the supply tube. The channel portion 80 is similar in structure to the molded channel portion 28 of the drippers 22 shown in FIGS. 1 through 9. This includes a similar labyrinthine channel 83 formed by the alternating baffles. The plastic film sheet 82 can be of the same polyethylene film material. The channel portion 80 is molded along one edge 81 of the film sheet 82. An inlet passage 84 in the form of a recess opens through an interior edge 86 of the molded dripper portion. An outlet passage 88 also in the form of a recess opens to the exterior edge 81 of the film.

Figure 11:
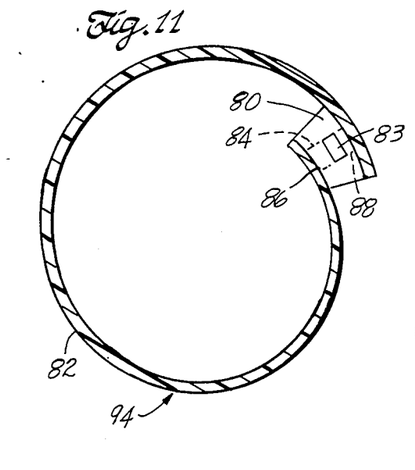
FIG. 11 is a cross-sectional view showing one technique for forming a drip emitter and supply tube from the sheet shown in FIG. 10.

FIG. 11 shows one embodiment of a completed drip irrigation line made from the molded dripper 80 and film 82. In this embodiment, a supply tube 94 is formed by wrapping the film 82 into a tubular form to form an elongated supply tube. The dripper 80 faces toward the inside of the tube, and the opposite face of the film overlaps the exposed face of the molded dripper. At intervals between the drippers the opposite face of the film overlaps the opposite inside edge of the film. The outer face of the film is heat bonded at 86 to the dripper portion 80 as well as to the overlapping edges of the film to form a seam along the length of the tube. Alternatively, the film may be adhesively bonded at 86. The portion of the film which is sealed to the exposed face of the dripper portion 80 serves as a seal for forming one face of the sealed internal labyrinthine channel of the drip emitter. Opposite ends of the molded dripper 81 (outboard the inlet 84 and outlet 88) are tapered down toward the film surface 82 to form a continuous seal at opposite ends of the dripper. In the lap seal embodiment illustrated in FIG. 11, the seal has good strength, and the internal pressure of water inside the supply tube during use applies pressure which tends to close the seal.

Figure 12:
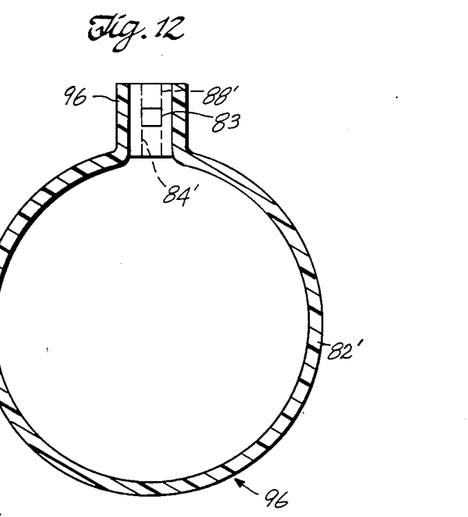
FIG. 12 is a cross-sectional view illustrating a second technique for forming a drip emitter and supply tube from the sheet shown in FIG. 10.

FIG. 12 shows an alternative embodiment of a drip irrigation line 96 in which the film 82' is formed into a tube, with the tube being sealed by heat or adhesively bonding opposing edges along the same face of the tube to form a flanged seal along the length of the tube. In this embodiment, the portion of the film which is bonded to the exposed face of the molded dripper at 96 forms external dripper units spaced apart along the length of the dripper line.

Figure 13:
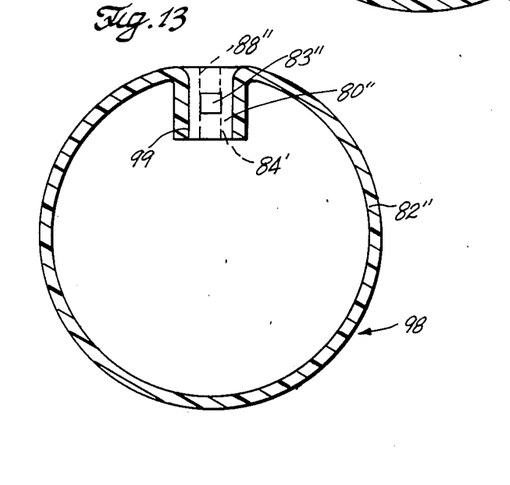
FIG. 13 is a cross-sectional view illustrating a third technique for forming a drip emitter and supply tube from the sheet shown in FIG. 10.

FIG. 13 shows a further embodiment of a drip irrigation line 98 in which the dripper units are folded to the inside of the tube. The opposite edges of the film on the face opposite the molded drippers 88" are overlapped to form an internal flanged seal heat or adhesively bonded at 99. At the points where the face of the film 82" overlaps each emitter, the overlapping film seals the exposed face of the dripper to form sealed internal dripper units along the length of the tube. In this embodiment, the dripper units are closer to the center of the supply tube and are thus less likely to experience clogging than with the other two embodiments.

FIG. 14 illustrates an alternative form of dripper according to principles of this invention. In this embodiment, half of the dripper supply tube is formed by a mulch film 100, which is conventionally used in agricultural fields for holding in heat or moisture around plants. The film 24' to which the dripper units 22' are bonded is sealed longitudinally (by heat sealing or adhesive bonding) to the mulch film at 102. This forms long continuous irrigation water supply tubes 104 on the mulch film, with the drippers 22' spaced apart along the inside of each tube 104. The supply tubes can be sealed to the underside of the mulch film, as shown in FIG. 14.

Thus, the method of this invention permits long lengths of multiple dripper lines to be manufactured simultaneously on a continuous production basis. Since the dripper consists of one part molded directly onto a strip of film which is then used to form at least a portion of the dripper supply tube, capital and labor costs involved with assembly and mounting of prior art dripper units are avoided. The method allows use of inexpensive injection molding techniques and reasonably inexpensive materials. Moreover, a reasonably wide latitude of pipe diameters and wall thicknesses can be used, from the more inexpensive film tubes to the greater wall thickness supply pipe. Further, the invention permits the drippers to be sealed in such a way that, during use, the internal water pressure in the supply line during field use acts to preserve the seal and thereby enhances the reliability of the dripper system.

What is claimed is:

1. A method for making an emitter-type drip irrigation line comprising forming a molded dripper element by injection molding onto a face of a flat, flexible sheet a thin, flat base layer of moldable material having an elongated flow-restricting passage injection molded in a face of said base layer opposite from the flexible sheet, the moldable material being in a molten state during the injection molding step so that heat from the molten material heat bonds the base layer directly to the face of the flat, flexible sheet, the flow-restricting passage being molded in a depthwise portion of said base layer so that the flow-restricting passage faces away from the flexible sheet and is separated from the flexible sheet by a depthwise portion of the base layer which is bonded to the flat, flexible sheet; allowing the injection molded dripper element to harden; sealing the injection molded flow-restricting passage on a side of said base layer which faces away from the flexible sheet for forming a sealed internal pressure-reducing emitter chamber in the molded dripper element; and forming a drip irrigation supply tube from said flexible sheet wherein an inlet to the sealed emitter chamber communicates with the interior of the supply tube and an outlet from the sealed chamber is exterior to the supply tube.

2. The method according to claim 1 including sealing the flow-restricting passage by placing a flexible strip over the flow-restricting passage on said layer, and heat sealing the strip to said layer to form the sealed internal pressure-reducing emitter chamber between the strip and the portion of the base layer molded onto the flexible sheet.

3. The method according to claim 1 including overlaying a thin, flexible sheet over the sealed chamber and over the face of the flexible sheet to which the sealed chamber is bonded, and sealing the sheets together for forming the supply tube from the sealed sheets, so that the sealed chamber is inside the supply tube.

4. The method according to claim 1 including forming the outlet as a passage through the flexible sheet, through the thin base layer of moldable material, an into the flow-restricting passage, the outlet being formed simultaneously with the injection molding of the base layer and the flow-restricting passage and with the heat bonding of the layer to the flexible sheet.

5. The method according to claim 1 including forming the supply tube, at least in part, from a mulch film.

6. A method for makind a drip irrigation line comprising depositing onto a face of a flat, flexible sheet a layer of molten material that is injection molded onto said sheet to form a flow-restricting dripper element heat bonded to said flat, flexible sheet by the heat of the injection molding process, the flow-restricting dripper element being formed by injecting the molten material into a die cavity of a die held against the face of the flat, flexible sheet for depositing a thin, flat base layer of the moldable material directly onto the face of the sheet while simultaneously, in said die cavity, molding a flow-restricting passage depthwise in a face of the base layer opposite from the face of the sheet, the flow-restricting passage being formed partially through the depth of the base layer so that a side of the flow-restricting passage closest to the flat, flexible sheet is formed by a depthwise portion of the molded base layer which is heat bonded to the flat, flexible sheet, leaving an open side of the flow-restricting passage facing away from the flexible sheet; scaling the open side of said flow-restricting passage to form a sealed internal pressure-reducing emitter chamber having an inlet and an outlet; and forming a drip irrigation supply tube from said flexible sheet so the emitter chamber is inside the supply tube, with the inlet to the emitter chamber communicating with the interior of the supply tube and the outlet from the emitter chamber extending through the wall of the supply tube to the exterior of the supply tube.

7. The process according to claim 6 including forming the outlet as a passage through the flexible sheet, through the thin base layer of moldable material, and into the flow-restricting passage, the outlet being formed simultaneously with the injection molding of the base layer and the flow restricting passage and with the heat bonding of the layer to the flexible sheet.

8. The process according to claim 6 including sealing the layer by placing a thin flexible strip over the flow-restricting passage on said layer, and heat sealing the strip to said layer to form the sealed interior passage between the strip and a portion of the layer injection molded onto the sheet.

9. The method according to claim 8 overlaying a flexible sheet over the sealed emitter chamber and over the face of the flexible sheet to which the sealed emitter chamber is bonded, and sealing the flexible sheets to each other for forming the supply tube.

10. The process according to claim 6 including forming the supply tube, at least in part, from a mulch film.

11. A method for making a drip irrigation line comprising forming a plurality of molded dripper elements and bonding the molded dripper elements to a face of a flat, flexible sheet, the dripper elements being heat bonded to the flexible sheet in flat layer form in a series of molded layers at intervals along the flexible sheet, each dripper element being formed by injection molding directly onto the flat, flexible sheet a thin, flat base layer of moldable material having a flow-restricting passage injection molded in a depthwise portion of the base layer on a side thereof opposite from the face of the flat, flexible sheet, the moldable material being in a molten state during the injection molding step so the heat from the molten material heat bonds the base layer to the face of the sheet, the base of the flow-restricting passage being formed by a portion of the base layer of moldable material which is heat bonded directly to the flat, flexible sheet, the opposite side of the molded flow-restricting passage opening outwardly away from the flexible sheet; sealing the outwardly opening side of each base layer opposite from the flexible sheet to form sealed internal pressure-reducing emitter chambers spaced apart along the flexible sheet, in which opposing sides of each emitter chamber are formed by the thin molded base layer and the seal, with an inlet to each emitter chamber and an outlet from each emitter chamber; and forming the flexible sheet, to which the emitters are bonded, into an irrigation supply tube with the emitter chambers spaced apart along the inside of the tube, with each inlet communicating with the interior of the tube, and with each outlet communicating to the exterior of the tube.

12. The method according to claim 11 in which an injection molding machine adheres the molded layers to the sheet by injecting a flat moldable material into a mold cavity and against the sheet, the flat heat from the injection molding process heat sealing the moldable material to the sheet.

13. The method according to claim 11 including sealing the face of each layer by placing an elongated flexible sheet over the injection molded layer and bonding a portion of the strip to the face of each layer.

14. The method according to claim 11 including forming multiple rows of said sealed emitter chambers along the flat flexible sheet, forming multiple lengths of said supply tubes, and longitudinally cutting between adjacent pairs of said supply tubes for simulataneously forming separate supply tubes each with a row of said emitter chambers.

15. The method according to claim 11 including forming the outlet as a passage through the flexible sheet, through the thin base layer of moldable material, and into the flow-restricting passage, the outlet being formed simultaneously with the injection molding of the base layer and the flow-restricting passage and with the heat bonding of the layer to the flexible sheet.

16. The method according to claim 11 in which the supply tube is formed, at least in part, from a mulch film.

17. The method according to claim 1 in which the molten material is injection molded onto the face of the sheet by holding the molten material under pressure in a die cavity and against the face of the flexible sheet while the sheet is stopped and until the moldable material hardens and bonds to the face of the flexible sheet, the die cavity having means to mold the shape of the pressure-reducing passage simultaneously as the layer of molten material is molded and bonded to the sheet.

18. The method according to claim 1 in which the flow-restricting passage in the base layer is molded as an elongated labryinthine channel, and the base of the labyrinthine channel, continuously from one end to the other, is formed by a depthwise portion of the base layer which is heat bonded directly to the face of the flexible sheet.

19. The method according to claim 1 in which the flow-restricting passage in the base layer is formed as an elongated labyrinthine channel with an upright boundary wall extending around the periphery of the labyrinthine channel, and in which the flow-restricting passage is sealed by a strip secured to the boundary wall to form said pressure-reducing emitter chamber.

20. The method according to claim 6 in which the molten material is held under pressure in the die cavity and against the face of the flexible sheet while the sheet is stopped and until the moldable material hardens and bonds to the face of the flexible sheet.

21. The method according to claim 6 in which the flow-restricting passage in the base layer is molded as an elongated labyrinthine channel, and the base of the labyrinthine channel, continuously from one end to the other, is formed by a portion of the base layer which is heat bonded directly to the face of the flexible sheet.

22. The method according to claim 6 in which the flow-restricting passage in the base layer is formed as an elongated labyrinthine channel with an upright boundary wall extending around the periphery of the labyrinthine channel, and in which the flow-restricting passage is sealed by a strip secured to the boundary wall to form said pressure reducing emitter chamber.

23. The method according to claim 11 including injection molding the dripper element by holding the molen material underr pressure in a die cavity against the face of the flexible sheet while the sheet is stopped amd until the moldable material solidifies and bonds to the face of the sheet.

24. The method according to claim 11 in which the flow-restricting channel in the base layer is molded as an elongated labyrinthine channel, and the base of the labyrinthine channel, continuously from one end to the other, is formed by a portion of the base layer which is heat bonded directly to the face of the flexible sheet.

25. The method according to claim 11 in which the flow-restricting passage in the base layer is formed as an elongated labyrinthine channel with an upright boundary wall extending around the periphery of the labyrinthine channel, and in which the flow-restricting passage is sealed by a strip to the boundary wall to form said pressure-reducing emitter chamber.

26. The method according to claim 1 in which the flow-restricting passage is molded in the base layer simultaneously and in the same mold while the base layer is being injection molded onto the face of the flat, flexible sheet and heat bonded to the sheet.

27. The method according to claim 26 including forming the supply tube from the flexible sheet so the sealed emitter chamber is inside the tube.

28. The method according to claim 11 in which the flow-restricting passage is molded in the base layer simultaneously and in the same mold while the base layer is being injection molded onto the face of the flexible sheet and heat bonded to the sheet.

29. The method according to claim 28 including forming the supply tube from the flexible sheet so the sealed emitter chamber is inside the tube.

30. The method according to claim 1 including the steps of alternately injection molding the dripper element and thereafter advancing the sheet a selected distance, followed by injection molding a further dripper element, and so on, to form a series of injection molded dripper elements spaced apart along the flat, flexible sheet.

31. The method according to claim 6 including the steps of alternately injection molding the dripper element and thereafter advancing the sheet a selected distance, followed by injection molding a further dripper element, and so on, to form a series of injection molded dripper elements spaced apart along the flat, flexible sheet.

32. The method according to claim 11 including the steps of alternately injection molding the dripper element and thereafter advancing the sheet a selected distance, followed by injection molding a further dripper element, and so on, to form a series of injection molded dripper elements spaced apart along the flat, flexible sheet.

* * * * *